(12) United States Patent
Champonnois et al.

(10) Patent No.: US 8,330,073 B2
(45) Date of Patent: Dec. 11, 2012

(54) METHOD AND DEVICE FOR LASER ABLATION OF A SURFACE COATING FROM A WALL, SUCH AS A COAT OF PAINT IN A NUCLEAR PLANT

(75) Inventors: François Champonnois, Bures sur Yvette (FR); Philippe Cormont, Le Bouscat (FR); Marie Geleoc, Saclay (FR); Christophe Hubert, Tremblay les Villages (FR); Christian Lascoutouna, Souzy la Briche (FR); Pierre-Yves Thro, Gif-sur-Yvette (FR); Pascal Wodling, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 980 days.

(21) Appl. No.: 11/922,413

(22) PCT Filed: May 18, 2006

(86) PCT No.: PCT/FR2006/001119
§ 371 (c)(1),
(2), (4) Date: Feb. 6, 2009

(87) PCT Pub. No.: WO2006/136669
PCT Pub. Date: Dec. 28, 2006

(65) Prior Publication Data
US 2009/0224178 A1    Sep. 10, 2009

(30) Foreign Application Priority Data

Jun. 20, 2005  (FR) ..................................... 05 06232

(51) Int. Cl.
*B23K 26/00* (2006.01)
(52) U.S. Cl. .......... 219/121.68; 219/121.69; 219/121.83

(58) Field of Classification Search ............. 219/121.68, 219/121.69, 121.83, 121.78, 121.8, 121.84, 219/121.85
See application file for complete search history.

(56) References Cited

U.S. PATENT DOCUMENTS

| | | | | |
|---|---|---|---|---|
| 4,063,063 A * | 12/1977 | Funck et al. | ............. | 219/121.76 |
| 4,368,080 A * | 1/1983 | Langen et al. | ..................... | 134/1 |
| 4,756,765 A * | 7/1988 | Woodroffe | ........................ | 134/1 |
| 4,949,358 A * | 8/1990 | Kantorski et al. | .............. | 372/94 |
| 5,151,134 A * | 9/1992 | Boquillon et al. | ................. | 134/1 |
| 5,662,762 A * | 9/1997 | Ranalli | ......................... | 156/707 |
| 5,780,806 A * | 7/1998 | Ferguson et al. | ........ | 219/121.68 |
| 5,882,487 A * | 3/1999 | Li et al. | .................... | 204/157.41 |
| 5,948,172 A * | 9/1999 | Neiheisel | .......................... | 134/1 |
| 6,144,010 A * | 11/2000 | Tsunemi et al. | ......... | 219/121.68 |
| 6,693,255 B2 * | 2/2004 | Freiwald et al. | ......... | 219/121.68 |
| 7,348,517 B2 * | 3/2008 | Egawa et al. | ............. | 219/121.73 |

FOREIGN PATENT DOCUMENTS

| | | |
|---|---|---|
| EP | 0 091 946 | 10/1983 |
| EP | 0 642 846 | 3/1995 |
| FR | 2 700 882 | 7/1994 |
| FR | 2 863 916 | 6/2005 |
| FR | 2 880 736 | 7/2006 |
| WO | 2005/058514 | 6/2005 |

* cited by examiner

Primary Examiner — M. Alexandra Elve
(74) Attorney, Agent, or Firm — Clark & Brody

(57) ABSTRACT

The invention concerns a method for laser ablation of a surface coating from a wall, such as a painted wall finish, for example in a nuclear plant to be decontaminated, and a device for implementing said method. The inventive ablation method includes sweeping shots on the coating of at least one pulsed laser beam with a laser beam quality factor $M^2$ less than 20, and characterized in that it comprises a direct control of said shots by optical deflection, such that the impact zones (I1, I2, I3,) of said shots on said coating are disjointed or substantially adjacent with minimized overlapping.

24 Claims, 2 Drawing Sheets

METHOD AND DEVICE FOR LASER ABLATION OF A SURFACE COATING FROM A WALL, SUCH AS A COAT OF PAINT IN A NUCLEAR PLANT

The present invention relates to a laser ablation method for ablating a surface layer of a wall, such as a coat of paint in a nuclear plant, and to a device for implementing this method.

The decontamination and clean-up of obsolete nuclear plants or those that have reached their age limit have become a priority in the nuclear industry. It is endeavored to clean the contaminated parts of these plants, avoiding the production of waste that is also contaminated and striving to minimize the cleaning effluents.

For most walls of nuclear buildings, simply removing the paint is sufficient. The techniques used hitherto are, in particular, stripping by means of a grinder or a nibbler, by sand-blasting or by chemical gels. The main benefit of these techniques lies in their simplicity of technological implementation. However, they have drawbacks, such as their high cost, which can be directly attributed to human intervention in an irradiated, environment, the large amount of dust generated in the building, and the quantity of the waste generated.

Another known solution for decontaminating nuclear installations consists in using laser ablation, which consists in removing a thin layer of the contaminating material to be removed, via the interaction of focused coherent light coming from a pulsed laser with this material. The surface of this layer rapidly heats up, causing the vaporization and then the ejection of the first layers of the material. This laser ablation technique is also applicable to other, non-nuclear fields.

The laser ablation devices used typically comprise a laser head (i.e. a laser source) designed to generate a pulsed laser beam and means for transporting this beam to a firing head or "stripping head" located downstream of the laser head, and which is provided with an optical system for focusing the shots on to the layer to be ablated.

In most cases, this firing head is located in the immediate proximity of the layer to be ablated, thereby requiring the aforementioned optical systems to be protected from the ablation products. Furthermore, as indicated in patent document EP-A-642 846, the firing head must be made to undergo very rapid movement in order to ensure a satisfactory rate of ablation and an acceptable overall operating cost. This poses problems when implementing it on an industrial scale.

In general, the laser head is placed away from the cleaning zone and the light is transmitted to this zone via an optical fiber. A mechanical device is then used to move a nozzle, formed by the end of this fiber connected to the optical focusing system, practically in contact with the surface to be decontaminated. This solution is known from patent documents EP-A-520 847 and U.S. Pat. No. 5,780,806 and is widely applied in the case of lasers emitting in the near infrared or visible ranges, since infrared light and visible light may be transported virtually without loss of energy in optical fibers, unlike lasers emitting in the ultraviolet range.

It is also known, for example from patent document FR-A-2 700 882, to project a thin layer of liquid that is not absorbent in the ultraviolet range, for example a layer of water, on to the surface to be ablated and to direct ultraviolet radiation on to this surface, which surface absorbs it and is ablated with increased efficiency by the rapid burning of the liquid droplets covering it. The drawback of this solution lies in the additional amounts of waste that it generates during ablation.

Since the energy required for this ablation is relatively high, all the known devices use pulsed lasers, and a succession of light pulses is built up in one and the same place. This succession with a high rate does not allow the ablated material to be removed, this remaining for a few instants in the air in the immediate vicinity of the wall, in the form of smoke or a suspension. The arrival of a new pulse again applies to suspension against the wall and creates "redeposits" which again sully or darken this wall.

The current trend is for those skilled in the art to increase not only the number of laser pulses applied in succession at one and the same point, but also the power of the laser shots used in these pulsed-laser ablation methods, so as to improve the effectiveness of the ablation, this power typically being of the order of a few hundred watts. This results in the services (i.e. the necessary supplies of electricity and compressed air, in particular) and the operating constraints being adversely affected, and also a relatively high operating cost and volume. Another consequence lies in the diameter of the focused beam delivered by such lasers, which is of the order of a few millimeters, thereby leading to surface power levels on the layer to be ablated but are less than those required. This therefore means that laser shots superposed at high rates must be imposed, merely to be able to offer satisfactory ablation times. However, these superposed shots have the drawback of promoting "redeposits" of ablated material, requiring the operator to carry out several passes during the scanning of the surface to be ablated, in order to reduce the amount thereof. The efficiency of the ablation operation is correspondingly penalized.

One object of the present invention is to provide an ablation method for ablating a surface layer of a wall, such as a paint coating in a nuclear plant, said method comprising at least one scanning pass in which shots from at least one pulsed laser beam with a beam quality $M^2$ of less than 20 are fired onto said layer, which enables the aforementioned drawbacks to be obviated.

For this purpose, the ablation method according to the invention includes a directional control of said shots by optical deflection in such a way that the simple or composite impact zones of said shots on said layer are separate or substantially contiguous with a minimized overlap.

Thus, if there is only one laser beam, the center of the impact zone of this beam on the layer to be ablated is moved, between two successive shots of this beam, through a distance at least substantially equal to the dimension of the impact zone along the axis of this movement (i.e. its diameter in the case of an impact zone of circular outline). In the case of a single beam, the result of one shot is called a "simple" impact zone.

If there are several laser beams, they are shot on to the layer to be ablated so as to be temporally synchronized and spatially juxtaposed, for example by means of a prism, so as to form a geometric repeat pattern, which can be deflected by the same optical deflection means as in the case of a single laser beam (these optical deflection means comprising, for example, one or more galvanometric mirrors). The pattern thus obtained has the form of a square or a rectangle, possibly rounded at the corners, and the impact zones of the various beams are substantially contiguous with a minimized overlap, so as to constitute a "composite" impact zone (associated with composite pulses) that can be likened to one and the same impact zone of larger size. Finally, this composite impact zone is also chosen so that the juxtaposition of several juxtaposed composite impact zones constitutes a uniformly ablated surface.

The invention is thus characterized in that the center of the simple or composite impact zone on the layer to be ablated is moved, between two successive shots of at least one laser beam, through a distance at least substantially equal to the dimension of the simple or composite impact zone along the axis of movement by optical deflection means.

In what follows, the size of a uniform beam is easy to define. When the beam is of the Gaussian type, its diameter is defined, by its width W at $1/e^2$. This is because, for a beam of energy $$e^{-\frac{2x^2}{w^2}},$$

the distance x of a half-width w of the beam is defined as the distance for which x=w, which gives for this value $W=1/e^2$.

By two consecutive shots never striking the same impact zone, "redeposits", blackening or smoke, as generated in the prior art, is avoided, as is also the use of a fluid (liquid or gas) intended for minimizing these "redeposits". The method of the invention consequently limits the amount of waste generated, this being particularly advantageous when the layer to be ablated is a hazardous or irradiated substance.

According to another feature of the invention, said ablation method comprises the following two steps:
  a) a prior experimental estimation of the fluence $f_0$ of said or each beam on said layer, which estimation is required at each pulse for said or each pass (i.e. for surface ablation of said layer without impairing the support with a view to its later use), taking parameters, including the constituent material of said layer to be ablated and the surface state of the latter, into account; then
  b) an adjustment of the energy of said or each beam at each pulse and/or of the largest transverse dimension of said or each pulsed beam in order to obtain said fluence $f_0$ in a single pulse.

It should be noted that the fluence of each beam is adapted to the nature and to the material of the layer to be ablated, so that the ablation of the impact zone is carried out in the most general case by a single laser pulse. Thus, when there are several beams, they may operate in parallel in different parts of the wall to be ablated.

Advantageously, when the thickness or the material of the layer to be ablated make complete ablation difficult in a single pass, said ablation method may comprise, prior to said estimation of the fluence, an estimation of the number of passes required, taking the constituent material of said layer, the thickness of the latter and the scan rate of said shot scanning into account, these required passes being separated by a time interval much longer than the time to move between two consecutive points. This time generally corresponds to the time for completely scanning the part to be ablated by the deflection means for a given position of the ablation device with respect to the wall to be ablated.

In this case, the aforementioned fluence is then adapted to the return of an ablation pass.

Advantageously, the fluence required for the ablation of a layer, or for a layer ablation pass, is obtained by choosing one or more beams of good quality, that is to say having a quality factor $M^2$ of less than 20, and by focusing this or these beams on to a small area. It is thus possible to achieve the required fluence for most applications with a laser that is significantly less powerful and smaller than in the prior art. It is particularly advantageous to choose a lower quality factor $M^2$, of less than 10.

In the present description, the quality factor $M^2$ is defined by the ratio of the product diameter x divergence angle for the laser beam in question to the product diameter x divergence angle for a transverse monomode laser beam of the same wavelength.

To measure this quality factor $M^2$, a lens of small spherical aberration is placed between the laser source and a measurement system, such as a camera. With this measurement system, the beam diameter (for example $1/e^2$) is determined around the Rayleigh region by taking a sufficient number of measurement points. The set of these measurement points approximates to a hyperbola of beam propagation type, and the quality factor $M^2$ is a coefficient of the hyperbola that allows the measurement points to be adjusted.

In accordance with the present invention, this quality factor $M^2$ is advantageously measured using the ISO/TC 172/SC 9/WG 1 N 56 or ISO/CD 11 146 standard, "Optics and optical instruments—lasers and laser-related instruments—test methods for laser beam parameters: beam width, divergence angle and beam propagation factor", 26 Nov. 1993.

The separate impact zones obtained by the method of the invention may advantageously be contiguous whenever the means for moving each of the beams are sufficiently rapid and precise and link the scan speeds to the laser shot pulse repetition frequency.

For this scanning, the invention uses a deflection head comprising at least one galvanometric mirror capable of deflecting the laser beam or beams, and preferably at least two galvanometric mirrors oriented along orthogonal directions so as to scan, on a defined part of the wall to be ablated, almost the entire surface of the layer to be ablated.

According to the invention, this scanning is advantageously carried out by controlling the movement of the galvanometric mirror or mirrors housed in said deflection head, in order to deflect the beam or beams on to a multitude of places on said layer, so as to reach regions of the latter that are not yet ablated.

Unlike in the aforementioned prior art, it should be noted that this deflection head advantageously makes it possible to deflect or focus the beam or beams without having to move this head (i.e. the latter remaining stationary during the ablation).

Preferably, this deflection head is located at a distance greater than 200 mm, and possibly up to 1 m, from the layer to be ablated. A value of between 400 and 600 mm appears optimum, insofar as it allows the contamination of the galvanometric mirror or mirrors during ablation to be minimized. With such distances, the galvanometric heads have no difficulty in rapidly scanning the part to be ablated, possibly achieving rates of several meters per second. The area to be ablated thus scanned is then around 100 $cm^2$ to 3000 $cm^2$.

Advantageously, as mentioned above with reference to composite pulses, the successive impact zones are substantially contiguous, and the shape of the impact zones is optimized so that a juxtaposition of impact covers as completely as possible the surface of the layer to be ablated, while minimizing the overlaps (these advantageously represent less than 10% of the area of each impact zone). The shape of the overall impact area is advantageously that of a square or rectangle with rounded corners.

The largest dimension of each impact zone may be between 10 μm and 500 μm.

Preferably, said deflection head has at least two galvanometric mirrors that are controlled in such a manner that said impact zones describe, in succession, a plurality of substantially contiguous parallel lines on said layer, each line consisting of a series of said impact zones.

According to one particularly advantageous embodiment of the invention, the impact zone corresponding to each of said shots is formed by an even number of laser beams that are temporally synchronized and juxtaposed, for example by means of a prism, so as to create a geometric repeat pattern, the outline of which is polygonal.

This situation may therefore be referred to as parallel "multiplexing" of several base laser beams, which increases the rate of ablation for a given layer of material practically in the same ratio as the number of laser beams used. For example, by using four lasers juxtaposed in the form of a square by means of a prism having four facets it is possible to double the scan speed of a line and to increase the spacing between two consecutive lines of said first group by a factor of two, thereby giving an overall ablation rate equal to four times the rate obtained with a single laser beam.

The scanning of a two-dimensional surface (i.e. by means of galvanometric mirrors) may advantageously be improved by describing, in succession, a first group of lines so as to separate them pairwise by a predetermined spacing corresponding substantially to the dimension of each point, orthogonally to the direction of the lines, and then a second group of said lines, each of which is inserted substantially contiguously between two consecutive lines of said first group. In other words, as in the case of CRT (cathode ray tube) scanning, the surface to be ablated is scanned in two half-frames, the first comprising the odd lines and the second comprising the even lines.

However, it is advantageous at the end of a line to avoid any dead time before returning to the start of the next line. To do this, when the simple or composite impact zone at the end of a line is reached, the beam or beams are deflected orthogonally to the line so that the next impact is juxtaposed with the last point on the line in this direction orthogonal to the lines. Then, for the impact afterwards, the beam or beams are again deflected along the direction of the lines, but in the reverse sense to that of the previous line, and so on until reaching the end of this new line.

If the amount of material to be ablated requires several successive passes, it is advantageous to carry out the next pass by orienting the scan lines orthogonally to the direction that they had during the previous scan so as to perform cross scanning so as to improve the quality of the ablation, and so on for the successive passes, if there are more than two of them.

Advantageously, a display technique is used to display the state of the layer to be ablated, such as an inspection using a camera, by increasing the contrast obtained, for example by fluorescence, said technique being coupled to image processing in order to distinguish the ablation regions from those that are not ablated and consequently to control the movement of said galvanometric mirror or mirrors of said deflection head. Other techniques, such as acoustic listening or plasma spectroscopic analysis, are possible for assisting deflection head control.

Even more advantageously, ultraviolet radiation coupled to said display technique may be used to improve the contrast between said ablated regions and those that have not been ablated.

In all cases where the fluence $f_0$ required by the layer to be ablated is greater than the fluence of the laser source arriving on the deflection head, an optical focusing system is placed immediately downstream of this deflection head. This focusing system usually has a focal length chosen so as to make the laser beam converge on the surface of the layer to be ablated.

However, the distance that the beam has to travel before impacting this layer varies, depending on whether its direction is along the axis of the lens or along its maximum inclination.

If the focusing is performed by a simple lens, its focal length will advantageously be chosen so as to ensure focusing for the average of the distances, between the shortest and longest distances that the beam may travel depending on its angle of deflection.

However, according to an optimum embodiment, the focusing device allows the beams coming from all inclinations produced by the deflection head to be focused on one and the same plane, as is for example the case with an F-theta lens.

When the wall to be ablated requires a fluence below the lowest fluence produced by the laser head(s), it is advantageous to slightly offset the focal point to the front or to the rear of the surface to be ablated (i.e. defocusing) so as to reduce this fluence.

When the method according to the invention is used to ablate a coat of paint (e.g. in a nuclear plant) or another surface coating (i.e. one of small thickness), each pulsed laser beam delivers, at each pulse, an energy of between 0.1 mJ and 10 mJ, but it would not be outside the scope of the invention to use a more powerful laser operated as described above.

When the method according to the invention is used to ablate a layer of dirt, a lower energy per pulse is applied. This is in particular the case when the wall is that of a precious or fragile object, such as a work of art, it being possible to reduce the energy of each pulse to about 1 μJ so as not to shorten the subsequent life of the work of art.

Each laser is preferably a fiber laser, that is to say a solid-state laser in which the active medium is located in the optical fiber, which constitutes both the laser cavity and the carrier for transporting the beam right to the work station. The optical fiber typically consists of double-clad fiber. The active core, made of silica doped with rare-earth ions is excited at its base by a diode laser, which is injected directly into the fiber. Two Bragg gratings written into the fiber act as the mirrors of a conventional laser cavity. The ytterbium (Yb) dopant ions make it possible to obtain an infrared emission spectrum with a wavelength of 1.06 μm.

The pulse repetition frequency is generally greater than 500 Hz so as not to excessively extend the time required to treat the wall to be ablated, but it would not be outside the scope of the invention to use a lower frequency, provided that the two steps a) and b) above are satisfied. To give an example, it is normal to use pulse repetition frequencies above 10 kHz, which may be up to or exceed 20 kHz. Combined with a scan speed of around 2 m/s, these pulse repetition frequencies result in a satisfactory ablation rate, even in the case of large areas, as for example in the case of nuclear decontamination.

Preferably, each laser beam generated is pulsed, with each pulse having a duration of between 20 ns and 500 μs, and even more preferably between 50 ns and 200 ns.

According to another feature of the invention, the extremely small value of the largest transverse dimension of the beams, which is preferably between 10 μm and 500 μm and, even more preferably in the case of a coat of paint to be ablated, between 80 μm and 120 μm, gives each beam a fluence on said coat ranging from 1 $J/cm^2$ to 50 $J/cm^2$ and advantageously ranging from 8 $J/cm^2$ to 20 $J/cm^2$, the intended fluence value depending in particular on the material to be ablated and on the surface finish of said coat.

A more energetic beam may be needed in special cases, such as for example the ablation of roughness, a bump or over thickness of paint (as occurs in the nuclear industry for fixing a point contamination), which may require a more energetic beam. However, it is generally preferred to keep the same beam and the same fluence, and perform, on the surface in question to be ablated, one or more other successive passes.

In general, it should be noted that the wavelength of the laser beam(s) used to implement the invention may be chosen in the infrared, ultraviolet or visible ranges, depending on the way in which the method is implemented and on the nature and surface finish of the layer to be ablated.

Advantageously, each of the laser beams used to implement the invention is pulsed with a wavelength lying within the infrared range.

Advantageously, said or each laser beam is emitted by a laser head constituting the downstream end of a fiber laser, as mentioned above.

According to another feature of the invention, said ablation method includes, during said scan, a confinement of the space lying between, on the one hand, the deflection head designed to deflect the laser beam(s) and possibly the optical focusing device located at its exit and, on the other hand, the layer to be ablated, said confinement including a step of sucking up the ablation residues and filtering them.

This confinement makes it possible to control the recovery of all the gases and aerosols generated by the ablation. Such a confinement is of the "dynamic" type (i.e. the confined air is independent of the ambient air) and may be carried out by using a cowl of a hood type, having a substantially frustoconical shape that diverges between the deflection head and the layer to be ablated, this hood being combined with suction and filtering means. This confinement prevents the ablation products generated from being dispersed into the ambient air, but also prevents "redeposits" on said layer, thereby preventing the ablation device from becoming contaminated—only the hood may be considered to be contaminated. In addition, this hood protects any operators working in the cleaning zone.

It should be noted that this confinement is much easier to implement within the context of the present invention than within the context of prior constructions, thanks to the large distance that may exist between the deflection head and the layer to be ablated.

According to one advantageous embodiment of the invention, in which said layer to be ablated is located in a cleaning zone, such as a contaminated zone, and said or each beam is emitted by at least one laser head connected to pumping means delivering electromagnetic radiation to said head, said or each laser head is connected to said pumping means via an optical fiber transmitting said radiation, in such a way that said pumping means are kept outside said cleaning zone. The reader may refer to international patent application PCT/FR2004/050738 of 20 Dec. 2004 in the name of the Applicant for a detailed description of this arrangement.

According to another advantageous feature of the invention, each laser beam has a beam quality $M^2$ of less than 10, and even more advantageously less than 2. This beam quality may advantageously be obtained by correcting the spherical aberration generated by the thermal effects in said laser head, which then contains at least one laser rod pumped by transverse optical pumping. For this purpose, an optical device having spherical aberration of a negative amplitude close, but of opposite sign, to the aberration due to said thermal effects is used in said laser head so as to compensate for this aberration with respect to said laser beam. The reader may refer to French patent application FR 05/50116 of 13 Jan. 2005 in the name of the Applicant for a detailed description of this spherical aberration correction method.

An ablation device according to the invention for implementing the method as defined above comprises at least one laser head designed to generate a pulsed laser beam and a deflection head fixedly mounted downstream of said or each laser head in order to deflect the shots of at least one beam on to a surface layer of a wall, scanning over said layer, with pulse durations that may each be between 20 ns and 500 μs.

According to the invention, said device is such that said or each laser head is suitable for being able to generate said or each beam with an energy of between 0.1 mJ and 10 mJ and in that said deflection head is suitable for deflecting said or each beam by giving it a largest transverse dimension on said layer that may be between 10 μm and 500 μm.

According to one advantageous embodiment of the invention, this device is such that:
said energy is between 0.1 mJ and 10 mJ;
the repetition frequency is between 10 kHz and 100 kHz;
the duration of each pulse is between 10 ns and 1 μs; and
the fluence is between 1 J/cm$^2$ and 50 J/cm$^2$.

This device is preferably used for ablating contaminated paints on the walls of a nuclear building, before rehabilitation or destruction. However, with the same features it is possible just as well to cover a very large range of applications where it is necessary to ablate a layer on a wall.

According to another feature of this device according to the invention, the deflection head includes, at its exit, a lens-type optical focusing system, which is designed to focus the laser beam on to the surface of the layer to be ablated. Advantageously, this focusing device is produced by an F-theta lens which makes it possible to maintain the focusing at any point on the scanned surface, by making the most inclined rays converge further away the greater their length.

According to another feature of the invention, the device comprises a confinement unit for confining the space lying between the deflection head and the layer to be ablated, said unit comprising ablation residue suction means and filtering means and being equipped with a system for positioning said device on said layer with a predetermined application force.

Advantageously, said confinement unit includes said substantially frustoconical hood, which is designed to be mounted around said deflection head via an opening upstream of said hood (corresponding to the small base of the cone frustum formed by the hood) and which is provided with an air intake in the immediate vicinity of this upstream opening, so as to optimize the flow of the ablation gases and aerosols, in order to suck them out.

According to another feature of the invention, said confinement unit is provided, near the downstream opening of the hood (corresponding to the large base of the aforementioned cone frustum), with a means of displaying the state of the layer to be ablated which is coupled to an image processing system in order to distinguish the ablated regions from those that are not ablated and consequently to control the galvanometric mirror or mirrors.

To ensure dynamic confinement, a suction rate is provided for ensuring, at all points at the air intakes, a minimum flow rate of 0.5 m/s. Furthermore, these air intakes must be designed so as to avoid any turbulence and to maintain laminar flow. Provided that the latter condition is met, the flow rate may reach several hundred m$^3$/h.

In accordance with the aforementioned way of implementing the ablation method according to the invention referring to patent application PCT/FR2004/050738 in the name of the Applicant, in which said layer to be ablated is located in a cleaning zone such as a contaminated zone, and said or each laser head is connected to pumping means delivering electromagnetic radiation to said head, said ablation device comprises an optical fiber connecting said pumping means to said laser head and transmitting said radiation.

In general, it should be noted that the dimensions of the ablation device according to the invention may vary according to the area of the layer to be ablated. Depending on these dimensions, such an ablation device may however be a portable machine operated by an operator, or a machine carried by a robot. In the latter case, a deflection head closer to the layer to be ablated, for example one located between 200 mm and 400 mm, will be chosen.

The ablation device according to the invention is moreover equipped with a robotic positioning system (not illustrated) according to the prior art, which is designed to position this ablation device against the layer to be ablated at specified spaces to within 1 cm. Preferably, this positioning system allows the confinement unit to be applied against this layer with a force of a few tens of newtons, for example about 100 N. Position sensors, such as electrical switches actuated by contact with the wall, are provided so as to inform the operator or remote operator that the ablation device is correctly positioned on the layer to be ablated.

Preferably, said or each laser head of the ablation device according to the invention is of the fiber laser type. However, it should be noted that the or each laser head may in general consist of any laser source (e.g. of the amplifying rod type instead of the optical fiber of said fiber laser) that is compatible with the requirements of the ablation method and of said system used for positioning the ablation device.

In accordance with the aforementioned spherical aberration correction method for the ablation method according to the invention referring to patent application FR 05/50116, in which said or each laser head contains at least one laser rod pumped by transverse optical pumping, the spherical aberration generated by the thermal effects in said laser head are connected by using, in the latter, an optical device having a negative spherical aberration of amplitude close, but of opposite sign, to the aberration due to thermal effects so as to compensate for this aberration with respect to said laser beam.

Advantageously, this optical device having a negative spherical aberration comprises a conversion lens or a combination of several lenses, at least one of which is convergent, such as an afocal doublet of two convergent lenses.

The aforementioned features of the present invention, together with others, will be more clearly understood on reading the following description of several exemplary embodiments of the invention given by way of illustration but implying no limitation, said description being in conjunction with the appended drawings in which.

Figure 1:
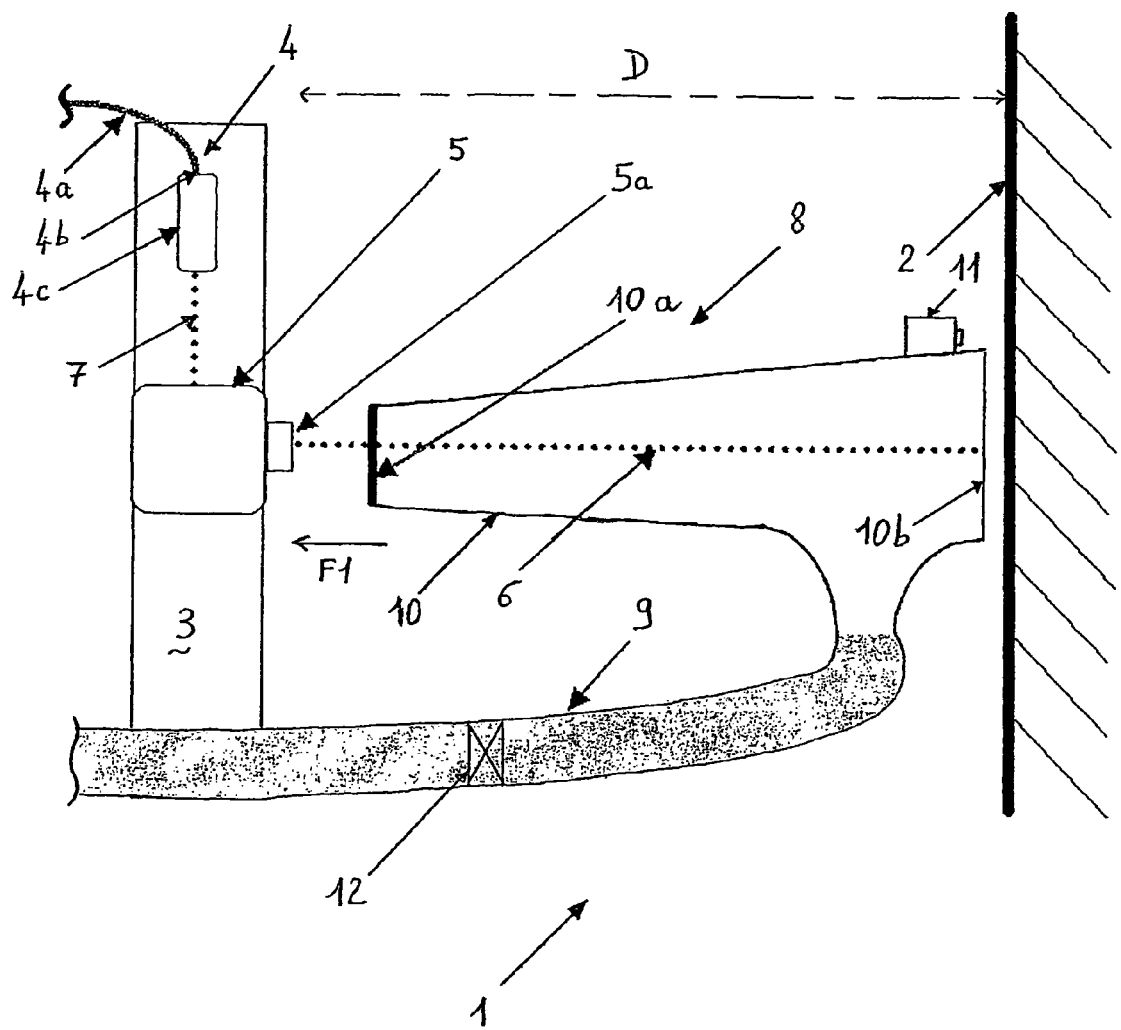
FIG. 1 is an exploded schematic top view of a laser device for a surface ablation of a layer of a wall according to the invention.

The ablation device 1 illustrated in FIG. 1 is more particularly intended for ablating a coat 2 of paint on a wall to be decontaminated in a nuclear plant, this coating 2 corresponding to a surface called, in this field, a "category 1" surface (i.e. with a suspicion of contamination of the type consisting of aerosols fixed by the paint).

The ablation device 1 includes a stand 3 on which the following are essentially mounted:

at least one laser head 4 (only one is shown in the example of FIG. 1) which is connected to a pumping means (not illustrated);

a deflection head 5 which is provided downstream of the laser head(s) 4 to receive the incident laser beam or beams 7 of fixed orientation with respect to the stand 3 and to deflect them into one or more beams 6 that undergo a scanning movement, this head advantageously including at its exit an optical focusing system 5a consisting of a lens for focusing the laser shots on to the surface of the layer 2 to be ablated; and a confinement unit 8 for confining the space lying between the deflection head 5 and possibly its focusing system 5a, and the surface of the layer 2 to be ablated, which unit is especially means 9 for sucking up the ablation residues and for filtering them.

The laser head 4 illustrated is the head supplied by the manufacturer, that is to say the downstream (or distal) end of a fiber laser. It includes a collimation lens defined for a beam diameter of 9 mm, said head being connected via an optical fiber 4a to the upstream (or proximal) end of the fiber laser (not shown in FIG. 1), which is provided with pumping means. The fiber laser used is one sold by the company IPG under the name "YLP" (i.e. ytterbium fiber lasers).

The fiber laser emits, via its laser head 4, a pulsed laser beam 7 in the infrared range—advantageously in the near-infrared range—having a diameter ranging from 2 to 15 mm, for example 9 mm, this diameter being considered to be constant over the entire length of its path in the air. Since the beam is Gaussian, the spacing between two impacts is $1/e^2$. This diameter is also considered to be that of the impact zone, the rest of the beam overlapping with the next impact. In the case of a plurality of laser beams, the various laser heads are optionally associated thereat with a device for making the axes of the various beams come together. Each of these beams 7 is generated with a high pulse repetition frequency of 20 kHz, with an energy per pulse of 1 mJ and a beam quality $M^2$ of around 1.6.

The deflection head 5 comprises galvanometric mirrors sold by Arges under the name "RHINO" or sold by Scanlab under the name "hurrySCAN". Fixed to its exit (in most embodiments) is a focusing system consisting of a lens forming for example a 420 mm objective. Preferably, this lens is an F-theta lens that focuses the laser shots on to the surface of the layer 2 to be ablated.

It gives at the focal point a beam 6 projected on to the layer 2 with a diameter of about 100 μm, a fluence of 12 J/cm² and a depth field of 10 mm.

The confinement unit 8 comprises a hood 10 of substantially frustoconical shape, which is designed to be fitted via its small base on to the stand 3, around the deflection head 5 (see arrow F1 in FIG. 1). The hood 10 is provided, at its end intended to be fitted around the deflection head 5, with an opening 10a of the window type, designed to let the focused laser beam 6 pass through it. This opening may also be made by fitting the hood 10 over the deflection head 5 by means of spacers.

The hood 10 is advantageously provided with an external camera 11 close to its other opening 10b, which is intended to be applied on the layer 2 to be ablated, this camera 11 being intended to display the state of the layer 2 so as to control the ablation. Advantageously, an ultraviolet light source is added to this camera 11 so as to improve the contrast of the paint layer 2 compared with the underlying support material (for example concrete).

The camera 11 is coupled to an image processing system (not illustrated), for example by digitizing the image after thresholding, which is designed to enable the ablated regions of the layer 2 to be distinguished from those that are not ablated and, after the image thus obtained is transferred to management software with which the deflection head 5 is equipped, to control the mirrors of the optical focusing system accordingly.

The hood 10 is designed to ensure dynamic confinement of the gases and aerosols, while protecting the operator, and, via an air intake (not shown), augmented by the abovementioned fastening spacers, it permits laminar flow of these gases and aerosols so that they are collected in filters 12 with which the suction means 9, the flow rate of which is 180 m$^3$/h, are equipped.

These filters 12 are specifically designed not to be clogged by the ablation residues, thanks to prior characterization of the latter. The suction means 9 are advantageously equipped with a VHE (very high efficiency) filter 12 so as to form an ultimate barrier for these ablation residues. The choice of filters 12 depends on the nature, the mass and the size of the particles generated by the ablation.

According to a variant, the ablation device according to the invention possesses a plurality of laser beams, each being associated with a deflection head specific to it, and this plurality of associations of laser source and deflection head is then integrated into one and the same hood. It goes without saying therefore that the synchronism of the beams is of little importance—the only thing that matters is the juxtaposition of the ablated parts that they create.

The ablation device 1 may be equipped with a suitable interface so that it can be automated and carried by a multiply articulated device (not illustrated) such as a special carrier, motor-operated arm or a robotic arm, in order to move it so as to cover a given ablation area.

The ablation device 1 according to the invention operates in the following manner, as illustrated in relation to FIGS. 1 and 2.

The ablation device 1 is placed against the coat 2 of paint at a distance D of around 500 mm therefrom, via a system (not illustrated) for positioning the confinement unit 8, and then laser beam shots 6 are produced by controlling the movement of the mirrors of the deflection head 5 (i.e. without the latter moving) so as to scan the part to be ablated.

Figure 2:
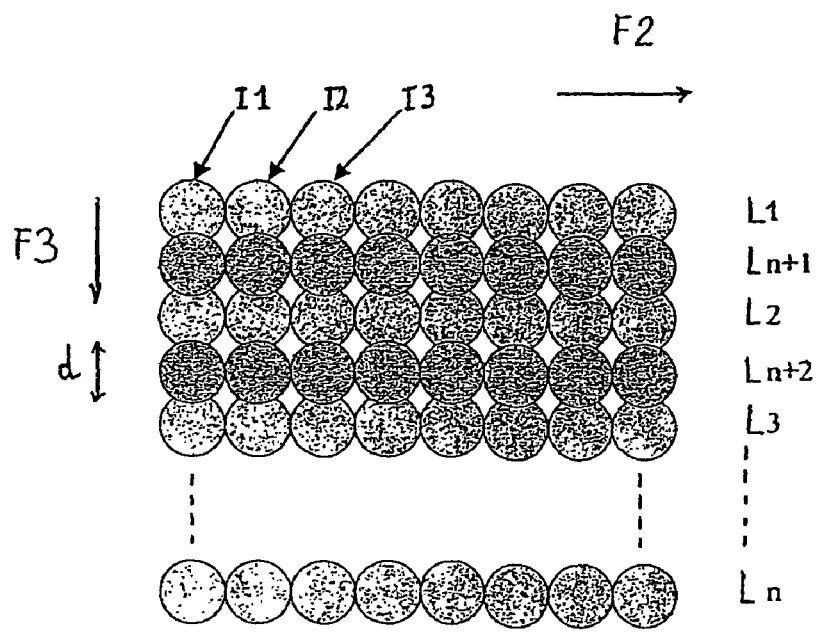
FIG. 2 is a plan view illustrating a preferred example according to the invention of a geometric distribution of the laser impact zones on the surface of the layer to be ablated.

As illustrated in FIG. 2, this scanning is such that the impact zones 11, 12, 13, etc. obtained on the layer 2 describe, in succession, a plurality of substantially contiguous parallel lines L1, L2, L3, . . . , Ln, Ln+1, Ln+2, . . . , each line corresponding to a succession of shots, the impact zones 11, 12, 13, etc. of which are themselves substantially contiguous with one another (see the arrows F2 and F3 illustrating this two-dimensional scanning).

In a first step, a first group of lines L1, L2, L3, . . . , Ln is described, by separating them pairwise with a predetermined spacing d corresponding substantially to the diameter of each beam 6 on the layer 2, and then, in a second step, a second group of lines Ln+1, Ln+2, . . . is described, each being inserted so as to be substantially contiguous between two consecutive lines L1 and L2, L2 and L3, etc. of the first group.

Ablation trials were carried out with a displacement rate of 2 m/s of the focused beams 6, thereby providing contiguous impact zones 11, 12, 13, etc., in relation to the frequency of the laser shots used, which was 20 kHz (see the circular outlines of these impact zones, which are mutually tangential).

It should be noted that this linear and substantially contiguous scanning makes it possible to minimize the overlaps between impact zones 11, 12, 13, etc. and to ablate only those regions of the layer 2 that are not yet completely treated, thus saving time for complete ablation of the layer 2.

Satisfactory, rapid and clean ablation was thus obtained over an area of 625 cm$^2$ of the paint coat 2 without having to move the ablation device 1, with an ablated thickness of the paint coat 2 of around 36 µm at m$^2$ in 2 hours and without redeposits, smoke or dispersion of residues within the ablation room, thanks to the suction and filtering provided by the confinement unit 8.

It should also be noted that the services (i.e. for electricity and compressed air) associated with the ablation device 1 are reduced and may be easily taken outside the cleaning zone.

Figure 3:
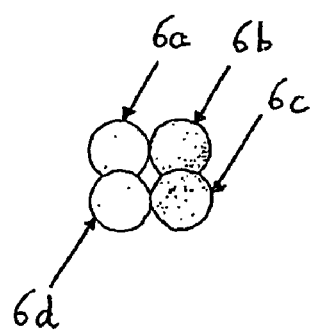
FIG. 3 is a plan view illustrating an example of a combination of 2n=4 laser beams, each forming the impact zone of a shot on this surface.

As illustrated in FIG. 3, it may be advantageous to use four temporally synchronized laser beams 6a, 6b, 6c and 6d which are obtained by four respective laser heads and advantageously juxtaposed in the form of a square by means of a prism having four facets, so as to double the scan speed of a line L1, L2, L3, . . . , Ln, Ln+1, Ln+2, . . . and the spacing between two consecutive lines of the first aforementioned group, in order to obtain an overall ablation rate increased by a factor of four. In this way, very satisfactory, clean and even more rapid ablation of the coat of paint 2, with an ablated thickness of paint 2 of around 3.6 µm per m$^2$ is obtained in only half an hour.

The invention claimed is:

1. An ablation method for ablating a surface layer (2) of a wall, said method comprising at least one scanning pass in which shots from at least one pulsed laser beam (6 or 6a, 6b, 6c, 6d) with a beam quality M$^2$ of less than 20 are fired on to said layer, wherein the method includes a directional control of said shots by optical deflection by a stationary deflection head (5) with pulse durations of between 20 ns and 500 µs and an energy each pulse being between 0.1 mJ and 10 mJ in such a way that the simple or composite impact zones of said shots on said layer are separate or substantially contiguous with a minimized overlap that represents less than 10% of the area of each impact zone which has a largest dimension (d) between 10 µm and 500 µm.

2. The ablation method as claimed in claim 1, characterized in that it comprises:
   a) a prior estimation of the fluence f$_0$ of said or each beam on said layer required at each pulse for said or each scanning pass, by taking into account a constituent material of said layer to be ablated and the surface state of the latter, into account; then
   b) an adjustment of the energy of said or each beam at each pulse and/or of the largest transverse dimension of said or each pulsed beam in order to obtain said fluence f$_0$ estimated in a).

3. The ablation method as claimed in claim 2, characterized in that it comprises, prior to step (a), said estimation of the number of said scanning passes required, by taking into account the constituent material of said layer, the thickness of the latter and the scan frequency of said shot scanning into account.

4. The ablation method as claimed in claim 1, characterized in that the impact zone (11, 12, 13) corresponding to each of said shots is formed by an even number of laser beams (6a, 6b, 6c and 6d) that are temporally synchronized and juxtaposed by means of a prism, to create a geometric repeat pattern, the outline of each impact zone on said layer being polygonal.

5. The ablation method as claimed in claim 1, characterized in that said stationary deflection head that is located at a distance (D) of between 200 mm and 1 m from said layer (2) to be ablated.

6. The ablation method as claimed in claim 5, characterized in that said scanning is carried out by controlling the movement of at least one galvanometric mirror housed in said deflection head (5) in order to deflect said beam or beams (6 or 6a, 6b, 6c, 6d) on to a multitude of places on said layer (2) so as to reach regions of the latter that are not yet ablated.

7. The ablation method as claimed in claim 5, characterized in that said deflection head (5) has at least two galvanometric mirrors that are controlled in such a manner that said impact zones (11, 12, 13) describe, in succession, a plurality of substantially contiguous parallel lines (L1, L2, L3, . . . , Ln, Ln+1, Ln+2, . . . ) on said layer (2), each line consisting of a series of said impact zones.

8. The ablation method as claimed in claim 7, characterized in that it carries out said scanning to describe, in succession:
   a first group of said lines (L1, L2, L3, . . . , Ln), separating them pairwise by a predetermined spacing corresponding substantially to said largest dimension (d) of each impact zone (11, 12, 13) on said layer (2); then
   a second group of said lines (Ln+1, Ln+2) which are each inserted so as to be substantially contiguous between two consecutive lines (L1 and L2, L2 and L3) of said first group.

9. The ablation method as claimed in claim 6, characterized in that a display technique is used to display the state of said layer (2) by increasing the contrast obtained by fluorescence, said technique being coupled to image processing in order to distinguish the ablation regions from those that are not ablated and consequently to control the movement of said at least one galvanometric mirror of said deflection head.

10. The ablation method as claimed in claim 5, characterized in that it comprises, during said scanning, a confinement of the space lying between said deflection head (5) and said layer (2) to be ablated, said confinement including a step of sucking out and filtering the ablation residues.

11. The ablation method as claimed in claim 2, characterized in that said fluence $f_0$ is between 1 J/cm² and 50 J/cm².

12. The ablation method as claimed in claim 1, characterized in that said shot scanning is carried out for a scan frequency of greater than 500 Hz.

13. The ablation method as claimed in claim 1, said or each beam (7) being emitted by at least one laser head containing at least one laser rod pumped by transverse optical pumping, characterized in that the spherical aberration generated by the thermal effects in said laser head is corrected using, in said head, an optical device having a negative spherical aberration of amplitude close to, but of opposite sign, to the aberration due to said thermal effects, to compensate for this aberration with respect to said laser beam.

14. The ablation method as claimed in claim 1, said layer (2) to be ablated being located in a cleaning zone and said or each beam (7) being emitted by at least one laser head connected to pumping means, characterized in that said or each laser head is connected to said pumping means via an optical fiber, in such a way that said pumping means are kept outside said cleaning zone.

15. The ablation method as claimed in claim 1, characterized in that said or each laser beam (6 or 6a, 6b, 6c, 6d) is pulsed in the infrared range.

16. The ablation method as claimed in claim 1, characterized in that said or each beam (7) is emitted by a laser head (4) constituting the downstream end of a fiber laser.

17. An ablation device (1) comprising at least one laser head (4) designed to generate a pulsed laser beam (7) and a deflection head (5) fixedly mounted downstream of said or each laser head in order to deflect the shots of at least one beam (6 or 6a, 6b, 6c, 6d) on to a surface layer (2) of a wall, scanning over said layer with pulse durations that may each be between 20 ns and 500 μs, characterized in that said or each laser head is suitable for generating said or each beam (7) with an energy of between 0.1 mJ and 10 mJ and in that said deflection head is suitable for deflecting said or each beam (6 or 6a, 6b, 6c, 6d) by giving it a largest transverse dimension on said layer that may be between 10 μm and 500 μm.

18. The ablation device (1) as claimed in claim 17, characterized in that said deflection head (5) comprises at least one galvanometric mirror that can be moved under the control of control means.

19. The ablation device (1) as claimed in claim 17, characterized in that it comprises a confinement unit (8) for confining the space lying between said layer (2) to be ablated and said deflection head (5), said confinement unit comprising ablation residue suction means (9) and filtering means (12) and being equipped with a system for positioning said device on said layer.

20. The ablation device (1) as claimed in claim 18, characterized in that said confinement unit (8) is provided with a means of displaying the state of said layer (2) which is coupled to an image processing system in order to distinguish the ablated regions from those that are not ablated and consequently to control said at least one galvanometric mirror.

21. The ablation device (1) as claimed in claim 17, characterized in that said or each laser head (4) is of the fiber laser type.

22. The ablation device (1) as claimed in claim 17, said or each laser head containing at least one laser rod pumped by transverse optical pumping, characterized in that the spherical aberration generated by the thermal effects in said laser head are connected by using, in the latter, an optical device having a negative spherical aberration of amplitude close to, but of opposite sign, the aberration due to thermal effects to compensate for this aberration with respect to said laser beam.

23. The ablation device (1) as claimed in claim 22, characterized in that said optical device having a negative spherical aberration comprises a conversion lens or a combination of several lenses, at least one of which is convergent.

24. The ablation device (1) as claimed in claim 18, characterized in that it comprises a confinement unit (8) for confining the space lying between said layer (2) to be ablated and said deflection head (5), said confinement unit comprising ablation residue suction means (9) and filtering means (12) and being equipped with a system for positioning said device on said layer.

* * * * *